US006849849B1

(12) United States Patent
Warner et al.

(10) Patent No.: US 6,849,849 B1
(45) Date of Patent: Feb. 1, 2005

(54) PORTABLE RADIOMETRY AND IMAGING APPARATUS

(75) Inventors: Charles C. Warner, Forest Grove, OR (US); Scott A. Foster, Tualatin, OR (US); Stewart W. Evans, Keizer, OR (US); Raul Krivoy, Beaverton, OR (US); Michael W. Burke, Tualatin, OR (US); John R. Rae, Lake Oswego, OR (US)

(73) Assignee: FLIR Systems, Inc., Portland, OR (US)

( * ) Notice: Subject to any disclaimer, the term of this patent is extended or adjusted under 35 U.S.C. 154(b) by 0 days.

(21) Appl. No.: 09/561,266

(22) Filed: Apr. 27, 2000

Related U.S. Application Data

(63) Continuation-in-part of application No. 09/210,167, filed on Dec. 11, 1998, now Pat. No. 6,255,650.

(51) Int. Cl.[7] .................................................. G01J 5/02
(52) U.S. Cl. ....................................... 250/330; 250/332
(58) Field of Search ............................... 250/330, 332, 250/339.04, 339.14, 339.15, 341.8, 342; 348/64, 164; 359/815; 345/8, 9

(56) References Cited

U.S. PATENT DOCUMENTS

| 4,156,292 A | 5/1979 | Helm et al. |
| 4,286,339 A | 9/1981 | Coombs |
| 4,301,998 A | 11/1981 | Rodway |
| 4,363,691 A | 12/1982 | Cannella et al. |
| 4,449,787 A | 5/1984 | Burbo et al. |
| 4,821,711 A | 4/1989 | Eckstein et al. |
| 4,884,137 A | 11/1989 | Hanson et al. |
| 4,970,589 A | 11/1990 | Hanson et al. |
| 5,005,213 A | 4/1991 | Hanson et al. |
| 5,035,474 A | 7/1991 | Moss et al. |
| 5,036,841 A | 8/1991 | Hamilton |
| 5,044,016 A | 9/1991 | Coombs |
| 5,083,204 A | 1/1992 | Heard et al. |
| 5,089,914 A | 2/1992 | Prescott |
| 5,200,827 A | 4/1993 | Hanson et al. |
| 5,389,788 A | 2/1995 | Grinberg et al. |
| 5,420,828 A | 5/1995 | Geiger |
| 5,422,484 A | 6/1995 | Brogi et al. |
| 5,563,962 A | 10/1996 | Peters et al. |

(List continued on next page.)

FOREIGN PATENT DOCUMENTS

| EP | 0 465 971 A2 | 1/1992 |
| EP | 0 471 264 A2 | 2/1992 |
| EP | 0 475 679 A1 | 3/1992 |
| GB | 773 898 | 5/1957 |
| GB | 1 533 859 | 11/1978 |
| GB | 2 167 644 A | 6/1986 |
| GB | 2 195 187 A | 3/1988 |
| GB | 2 251 780 A | 7/1992 |
| WO | WO86/05281 | 9/1986 |
| WO | WO00/37970 | 6/2000 |

OTHER PUBLICATIONS

Cairns VIPER, The Next Generation of Hand Held Thermal Imaging, 1999, brochure.

*Primary Examiner*—Scott J. Sugarman
*Assistant Examiner*—Richard Hanig
(74) *Attorney, Agent, or Firm*—Kolisch Hartwell, P.C.

(57) ABSTRACT

An infrared (IR) camera and associated electronics including power are integrated into portable, self-contained, vision-enhancement apparatus useful in environments of dense air-borne particulate and thermal extremes such as encountered in fire fighting situations, in accordance with the invention. The IR camera is integral with a self-contained power supply so that the system is portable and requires no umbilical cord or other external connections. The camera includes an imager that is preferably an un-cooled focal plane array, and associated imaging, storing, processing and displaying electronics that are cooled in the extreme thermal environment using an integral plural phase heatsink.

93 Claims, 8 Drawing Sheets

U.S. PATENT DOCUMENTS

| | | |
|---|---|---|
| 5,637,389 A | 6/1997 | Colvin et al. |
| 5,660,549 A | 8/1997 | Witt |
| 5,726,632 A | 3/1998 | Barnes et al. |
| 5,815,126 A | 9/1998 | Fan et al. |
| 5,856,811 A | 1/1999 | Shih et al. |
| 5,895,972 A | 4/1999 | Paniccia |
| 5,910,842 A | 6/1999 | Piwonka-Corle et al. |
| 5,936,245 A | 8/1999 | Goillot et al. |
| 5,949,583 A | 9/1999 | Rallison et al. |
| 6,016,160 A | 1/2000 | Coombs et al. |
| 6,023,061 A | 2/2000 | Bodkin |
| 6,023,288 A | 2/2000 | Coombs et al. |
| 6,255,650 B1 | 7/2001 | Warner et al. |
| 6,317,321 B1 * | 11/2001 | Fitch et al. .......... 361/700 |

* cited by examiner

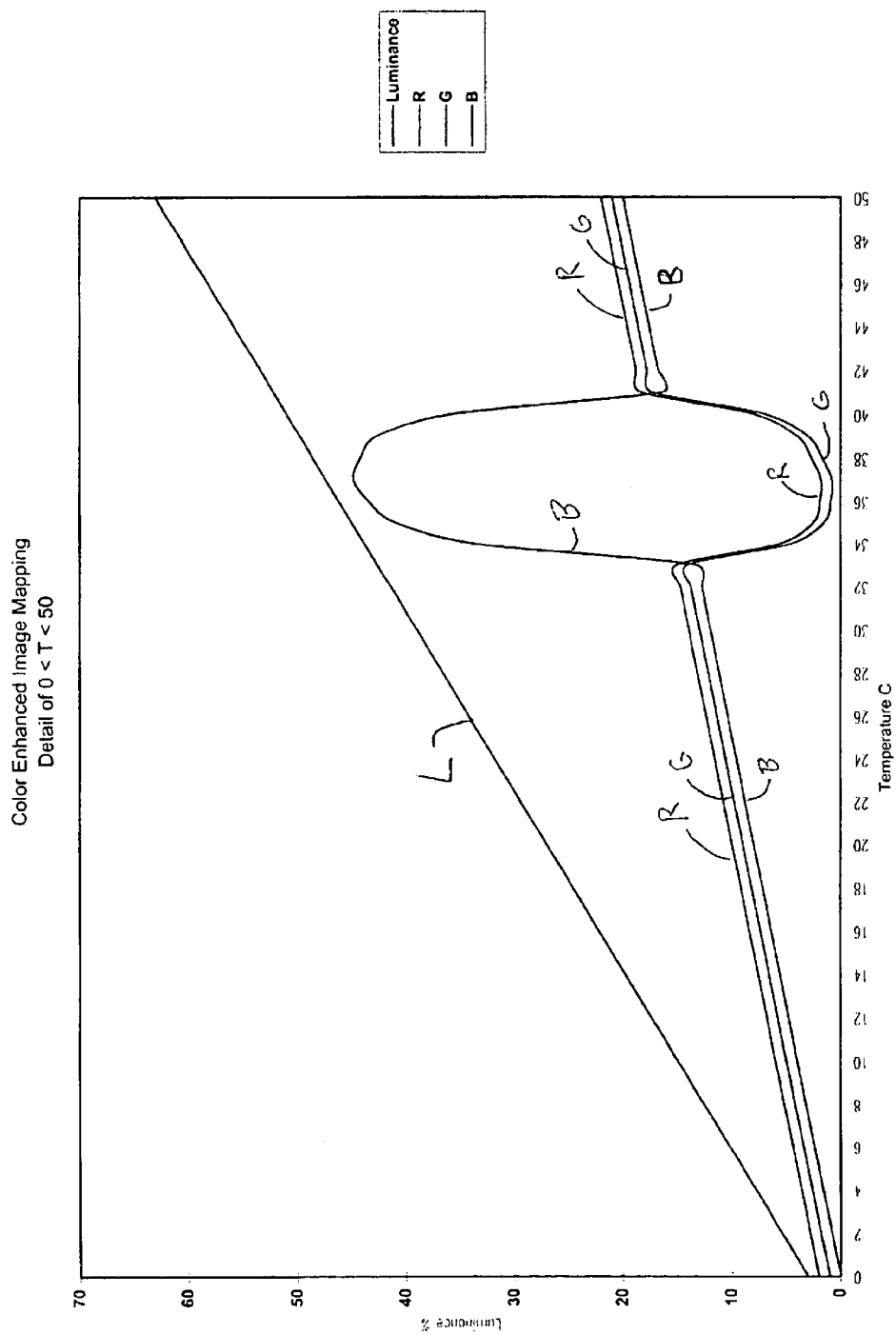

PORTABLE RADIOMETRY AND IMAGING APPARATUS

CROSS-REFERENCE TO RELATED APPLICATION

This application is a continuation-in-part of U.S. patent application Ser. No. 09/210,167, filed Dec. 11, 1998, now U.S. Pat. No. 6,255,650, which is hereby incorporated by reference.

TECHNICAL FIELD

The present invention relates generally to hazard-avoidance and blind vision equipment for use in extreme temperatures. More particularly, it concerns a self-contained, portable, easily deployed, helmet-mounted thermal or infrared (IR) imaging system capable of unobtrusively expanding the view of users such as fire fighters by providing a head-up IR detecting and imaging of a scene in front of a user, displaying an image that eliminates or sees through obscurants such as dark, smoke and particulate that may otherwise blind the user.

BACKGROUND ART

Fire fighting is extremely hazardous and demanding because of extreme temperatures and obscurants that can blind or disable a fire fighter from locating the fire's source or human beings at risk within a burning building. When there are no visible flames, e.g. when alcohol, hydrogen, hydrocarbons, etc. burn, there can be lethally high temperatures caused by gases that burn without visible ignition or flaming. Whether there are visible or invisible flames, nevertheless there can be dense smoke or airborne particulate that makes normal vision impossible. At night or in dark locations, even without extremely high temperatures and even without obscurants, vision is essential to containing a fire or saving a life.

Conventionally, inard (IR) vision subsystems for fire fighters have been bulky and integrated with other fire fighting protective equipment worn by fire fighters. They also typically have required an umbilical cord to equipment worn on the body of the fire fighter. Typically, IR equipment is connected with protective body gear referred to herein as a bunker suit typically including or augmented by self-contained breating apparatus (SCBA).

Other vision systems for fire detection are not designed for hands-free operation as is required of a system used by firefighters that must enter the scene of the fire. For example, U.S. Pat. Nos. 5,422,484 and 5,726,632, the disclosures of which are incorporated herein by reference, disclose various hand-held or pedestal-mounted flame sensors.

So-called night vision systems relying on IR detection and imaging often are useless in the presence within the detector's field of view of such extreme temperatures that the location of a human being or animal, for example, in a burning building goes undetected by a display phenomenon called blooming whereby a high-temperature gas cloud is represented by a color, e.g. white, that tends to wash out critical detail such as a low-temperature temperature human form represented in another area of the display by a different gray scale. Effectively, the high-temperature cloud within view of the IR detector bleaches out needed detail in another area of the display, such as that of a human form. For example, the video systems of U.S. Pat. No. 5,200,827, the disclosure of which is incorporated herein by reference, do not address these problems unique to the firefighting and rescue fields.

DISCLOSURE OF THE INVENTION

A head-up display, an infrared (IR) camera and associated electronics including power are integrated into portable, self-contained, wrap-around, face-wom vision-enhancement apparatus useful in environments of dense air-bome particulate and thermal extremes such as encountered in fire fighting situations, in accordance with the invention. Reflective and opaque expanses or lenses are provided in front of a user's eyes at approximately eye level for IR vision display and blinding purposes, respectively, to produce a clear bright picture or image representing a detected and imaged scene viewed by the camera otherwise obscured by darkness or obscurants. The IR camera is integral with the wraparound system along with a self-contained power supply so that the system is portable and requires no umbilical cord or other external connections. The imager is preferably an uncooled focal plane array. Associated imaging, storing, processing and displaying electronics are cooled in the extreme thermal environment using an integral plural phase heatsink, to protect elements of the apparatus from environmental heat.

The apparatus is separate from, but compatible with, helmets and SCBA and attire worn by the user so that it can easily be installed and removed by an individual user. Extended hands-free operation is provided in a lightweight package providing enhanced vision via color-coded temperature banding for display purposes, the color coding being performed in nmicroprocessor-based fminware that forms part of the electronics. The apparatus may be temporarily affixed via a clip and strap to the brim of a helmet and may be easily shifted on the user's face from its normal night-vision position to a temporary stowed position in front of the forehead whereby the user has virtually unobstructed binocular vision. The intended use of the apparatus is for firefighting and fire rescue, but it is believed to have application in other rescue and adverse conditions, associated with vehicle accidents, mining accidents, and combat.

Objects and advantages of the present invention will be more readily understood after consideration of the drawings and the detailed description of the preferred embodiment which follows.

BRIEF DESCRIPTION OF THE DRAWING

FIGS. 7A and 7B are graphs at illustrate the color mapping method used in the invented apparatus for image

Figure 1A:
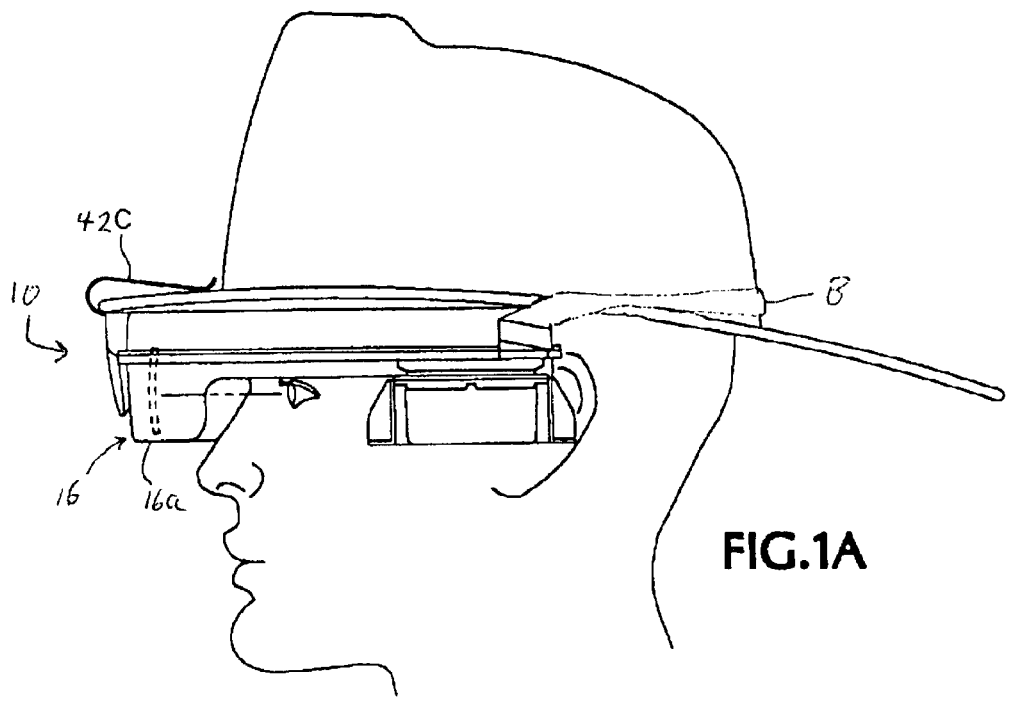
FIGS. 1A and 1B are side elevations of the invented apparatus, with FIG. 1A showing the apparatus infrared (IR) mode of deployment and with FIG. 1B showing the apparatus in a tilted-back, drect-view mode of deployment.

DETAILED DESCRIPTION OF THE PREFERRED EMBODIMENT AND BEST MODE OF CARRYING OUT THE INVENTION

Referring first to FIGS. 1A, 1B, 2A and 2B, a preferred embodiment of the invented wrap-around, head-up display apparatus is indicated generally at 10. Apparatus 10 may be seen to include a left arching region 12, a right arching region 14 and a forward arching region 16 that hovers preferably just above the user's eye level on the face. Apparatus 10 preferably includes a lightweight, preferably molded polymer housing with an interior void in which are located all essential components including an IR (thermal) optical engine 18 located adjacent forward region 16.

Optical engine 18 includes an un-cooled bolometric IR detector array 20, preferably of the type described and illustrated in commonly owned U.S. Pat. No. 5,554,849 entitled MICRO-BOLOMETRIC INFRARED STARING ARRAY and issued Sep. 10, 1996, the disclosures of which is incorporated herein by reference. Array 20 produces a high-resolution, two-dimensional, temperature pixel image of a scene within its field of view. The image produced by array 20 is stored in a digital memory 22 managed by a microprocessor 24. Left region 14 includes a battery subsystem 26 for integrally powering all components.

Bolometric IR detector array 20, because it is un-cooled (by which is meant it is not cryogenically cooled), produces only slight heat itself, but nevertheless is sensitive to heat in the ambient environment around it. Thus, an important contribution of the invention is a fluid heatsink 28 for removing heat from optoelectronics 30 including optical engine 18, array 20, memory 22 and processor 24. Optoelectronics 30 typically are subject to extreme environmental heat that may be produced by a fire. Accordingly, heatsink 28 is provided to ensure continuous, long-term, accurate temperature profile detection and imaging by the detector array despite the environmental extremes.

FIG. 1A will be understood as showing apparatus 10 in its deployed position whereby the user is blinded in a left eye and vision-enhanced in a right eye, as described above. The choice of the right or left eye for blinding and viewing is predetermined for each apparatus 10, but it will be understood that a mirror-image version of apparatus 10 may be constructed for those users that prefer blinding the right eye, and visionenhancing the left eye. All of the drawings and the discussion herein is for a right-eyeX enhanced embodiment.

Figure 1B:
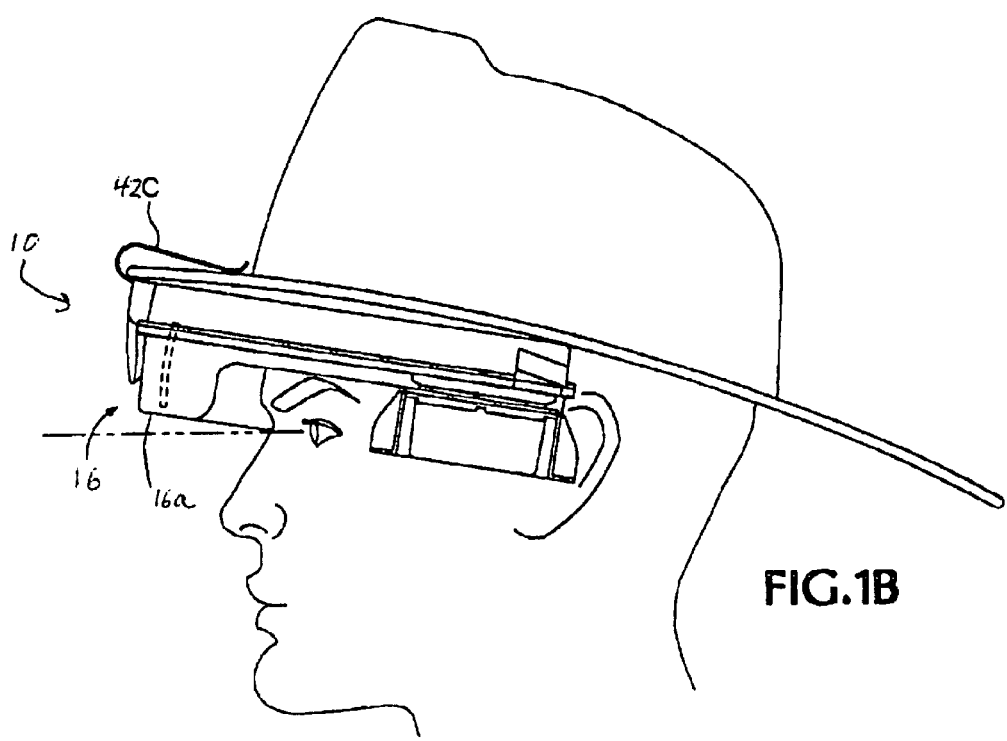

FIG. 1B corresponds directly with FIG. 1A and shows the same features as those described above but in a different orientation. FIG. 1B shows apparatus 10 in a tilted-back or stowed position in which the user is able to see relatively unobstructed and unenhanced with the naked eyes when the vision-enhancement features of apparatus 10 are not needed. It will be appreciated that the configuration of front region 16 of apparatus 10 wherein the lower edge 16a of region 16 terminates in a line just below eye-level makes it possible to tilt apparatus 10 back toward the forehead ever so slightly to afford the user a direct unenhanced and relatively unobstructed view, as indicated.

It is believed that this configuration of apparatus 10 is preferable to alternative arrangements whereby, for example, a visor section flips up away from the frame on a hinge along the top or is removable or whereby the left lens is rendered transparent for direct viewing with the left eye or whereby the right and/or left lens is rendered only translucent such that an IR image and direct view are superimposed within the view of the user. The lens hinge or removal configurations over which apparatus 10 is believed to represent an improvement require a hinge or connection between the active display surface and the framne, thus potentially disturbing or destabilizing the optical path from the IR camera to the user's eye.

The translucent display lens configuration over which apparatus 10 distinguishes itself is known to cause eye-strain and confusion in many users due to the superposition of often slightly conflicting images. Confusion from superimposed images is unavoidable, since the natures of infrared energy and visible spectral energy are by at definition different, and amorphous object or target boundaries result in confusion when the different images are superimposed. Often the infrared image will lag the direct image, for example, as the user's head is turned. Invented apparatus 10 avoids these problems by going against conventional wisdom in head-up IR displays and provides the user with the option of choosing to view a scene in either monocular IR or in binocular direct view modes of operation by a simple tilt or rotate of the apparatus about the user's ears.

Figure 3:
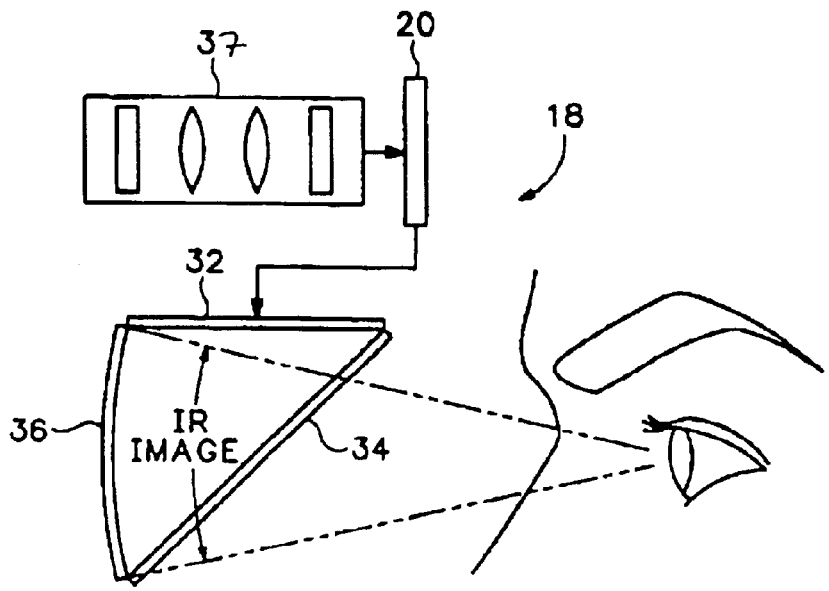
FIG. 3 is an optical schematic diagram corresponding with FIG. 1A illustrating the IR optical geometry of the invention.

Referring next to FIG. 3, the optical imaging technique used in accordance with the invention is illustrated schematically. Optical engine 18 may be seen in a slightly different form here to include array 20, a preferably back-lit liquid crystal display (LCD) 32 providing preferably at least 320×240 pixel resolution with a minimum 6-bit gray scale, a partially (preferably 50%) reflective planar mirror or mirrored lens 34 that turns the LCD image onto a focusing curved 100% reflective mirrored surface 36 that reflects the 50% intensity image back through 50% reflective surface 34 into the firefighter's eye. The display expanse may be viewed by looking through mirror 34 at focusing mirror 36, providing an approximately 25% polychromatic spectral energy efficiency, IR-representative field of view below which the firefighter may view the scene directly as indicated. Optical engine 18 also includes an IR camera unit 37 mounted as better illustrated in FIGS. 7A and 7B to intercept a frontal infrared scene along its focal axis.

The objective lens optical components within optical engine 18 preferably meet the F 1.3 optical standard in operation. The objective lens preferably is a 1" a diameter lens having a 30° azimuth (horizontal) field of view for wide-angle scene imaging. The lens also preferably is transmissive of IR energy in the 8 to 12 micron spectral bandwidth. The focus range of the lens is preferably set to 2 to 24 feet for normal viewing, but may be manually adjusted to 100 feet optimum focus distance.

Forward region 16 of apparatus 10 thus may be seen from FIGS. 1A, 1B, 2A, 2B and 3 to include a curved display expanse within and extending across an upper portion of a user's right eye field of view and a 'blind' or opaque expanse 38 within the user's left eye field of view. The left eye of the user thus is preferably covered, or 'blinded.' By enabling through one eye an IR image of the fire scene and through the other eye an obstructed or 'blind' view (as the parallax view resulting from a user's slightly laterally separated eyes and the depth perception obtained as a result of the parallax view are relatively unimportant in this so-called night-vision environment), weight, power and cost are saved without significant compromise of IR image.

Importantly, prior art difficulties with the user resolving a visual image through one eye and an IR image through the other, or resolving a visual image and an IR image through the same one or more eyes, are avoided. Depth distortion whereby one image suggests a foreground scene or shorter distance to an object and a different superimposed image suggests a background scene or greater distance to an objects distortion of visual perception that is inherent in superimposition vision systems—also is avoided.

Placement of the eyeglass forward region of apparatus 10 relative to the user's head and particularly the user's face such that its bottom edge effectively cuts across the bridge of the nose is an important feature of the invention. Configuring apparatus 10 to achieve this strategic placement permits the user normally to view the fire scene monoscopically via LCD 32 and nmirrored lens 36, and, alternatively, to view the scene stereoscopically and unaided beneath the eyeglass portion, by looking below the display expanse. Such dual mode viewing is very easily accomplished by a momentary, slight backward tilt of the user's head around which apparatus 10 wraps or by a momentary, slight backward tilt of the apparatus relative to the user's head. This invented feature will be referred to herein as bi-focality.

It will be appreciated that it is the dimension and configuration of the apparatus—and its resulting automatic positioning relative to the elevation of the user's eyes by its conformation with the bridge of the nose and the ears such that it perches at a given elevation on the user's face—that results in bifocal operation, i.e. the dual mode operation achieved by a slight tilting forward or backward of the head or the slight tilting backward or forward of the apparatus. This is perceived to represent a great advantage over prior art systems that require the user's mind to resolve simultaneous inputs to either eye (in a left-and-right bifurcated system) or both eyes (in a head-up, see-through system), one of which is unaided vision and the other of which is IR imaged vision, which superposition is believed to be confusing and potentially hazardous.

Figure 2A:
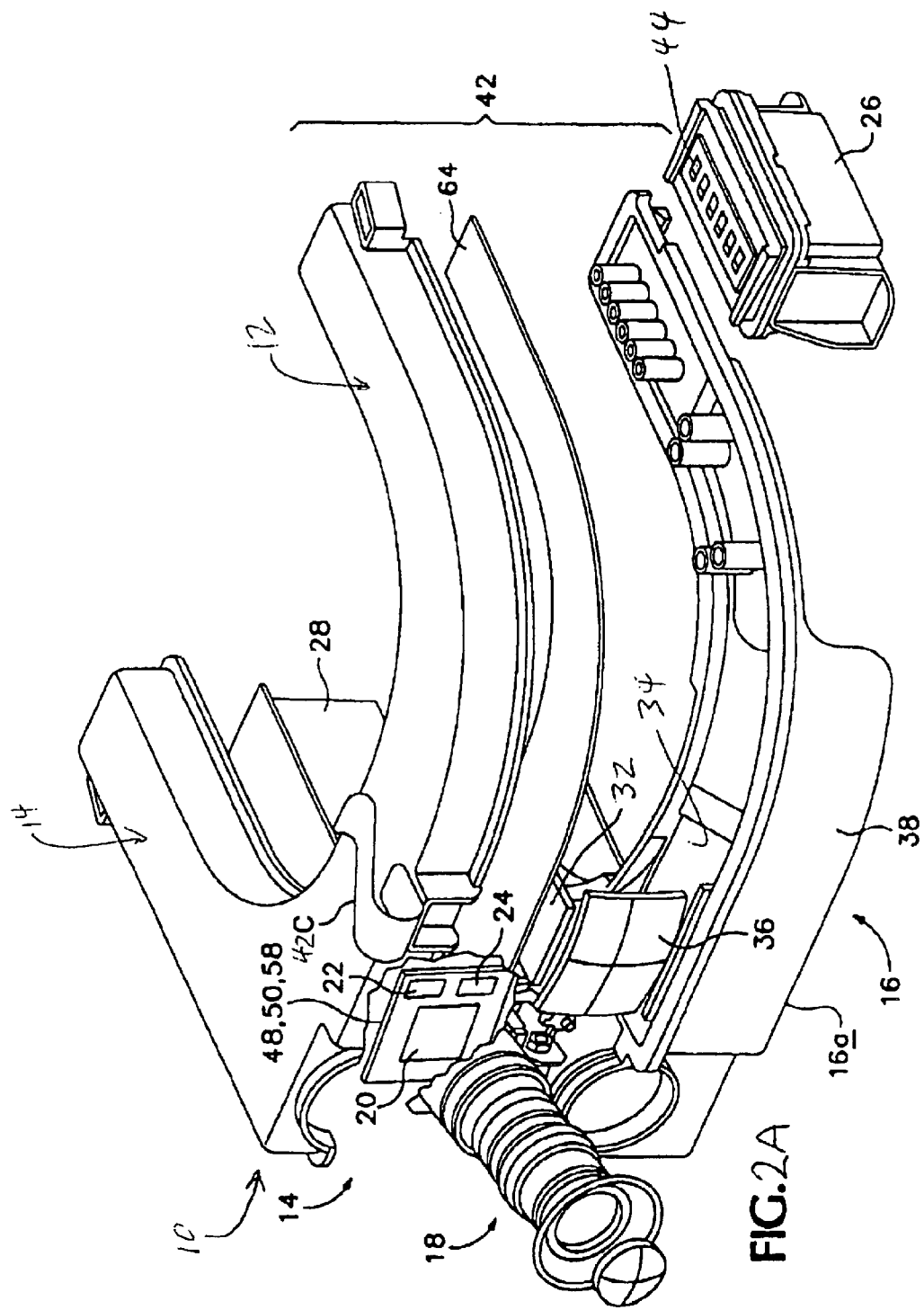
FIGS. 2A and 2B are isometric views of the invention, with FIG. 2A showing an exploded, partly assembled version and with FIG. 2B showing a fullly assembled version, with certain portions of the imaging apparatus's housing cut away to reveal certain interior details.
Figure 2B:
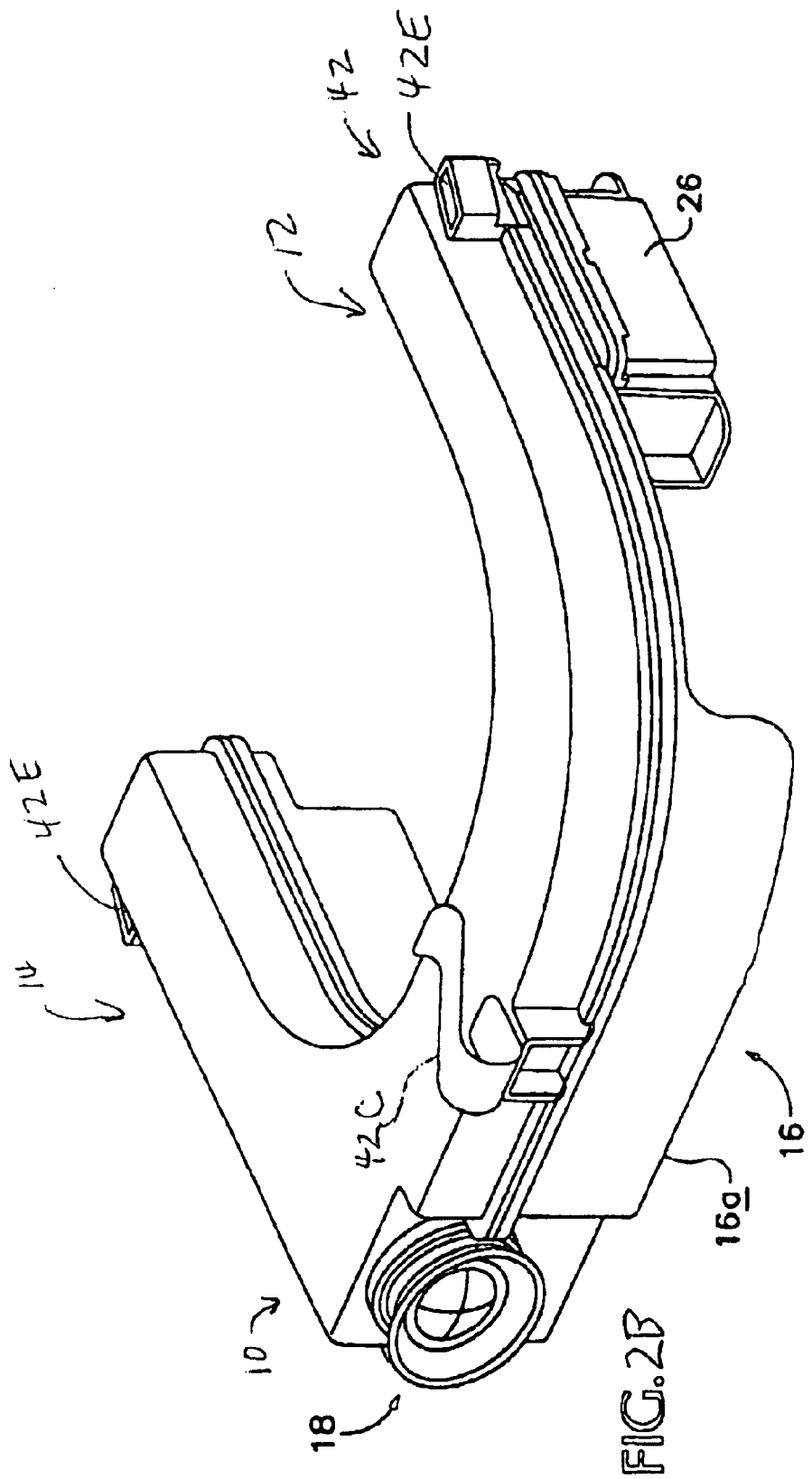

FIGS. 2A and 2B show apparatus 10 in isometric view corresponding generally with FIGS. 1A, 1B and 3, with identical component parts identically designated by reference designators. FIGS. 2A and 2B are exploded, partly assembled, and fildly assembled versions of apparatus 10, respectively. Also shown in FIGS. 2A and 2B are the internal configuration of various subsystems within a housing of apparatus 10. The subsystems include battery subsystem 26, opto-electronics indicated generally at 40, and a clamshell housing assembly, or simply housing, 42. It will be understood that opto-electronics 40 include optical engine 18 and electronics, to be described in more detail by reference to FIG. 5, most or all of which are mounted within housing 42.

The subsystems listed above that form a part of apparatus 10 will be understood to be operatively connected as suggested by FIGS. 2A and 2B. For example, battery subsystem 26 provides regulated DC power to opto-electronics 40 within housing 42 via one or more electrical conductors 44 that route power and ground, as well as control and communication signals between the two subsystems and more particularly to electronics 46 of opto-electronics 40. Preferably, battery subsystem 26 includes a Sanyo HR-4/3FAU or Panasonic HHR-450AB01 battery.

Figure 5:
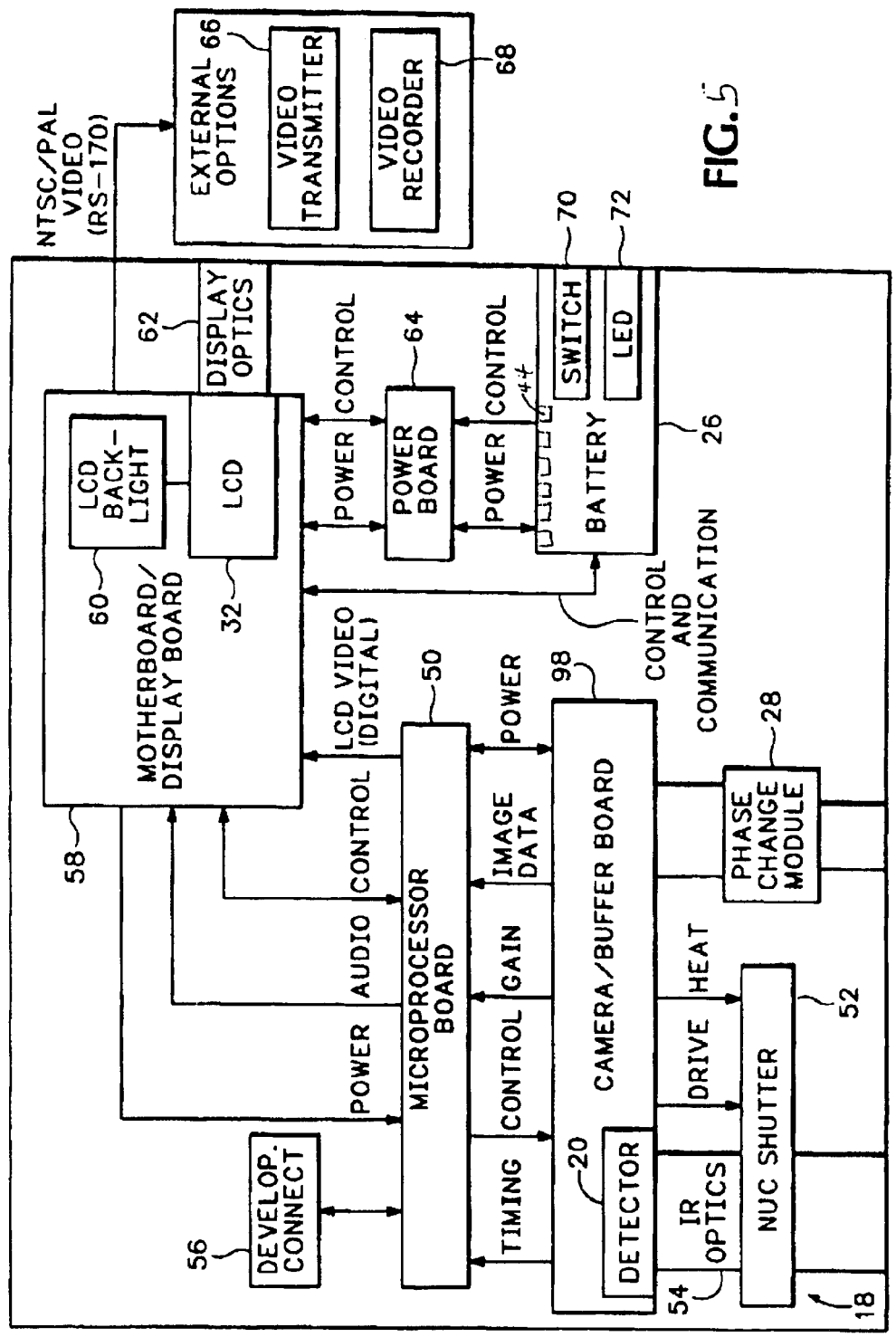
FIG. 5 is a block diagram of the opto-electronics within the housing of the invented appa.

Battery subsystem 26 may also include circuitry, not shown, that monitors usage of battery 26 so that warning messages may be produced if the remaining charge of battery 26 has dropped below a certain level, or if battery 26 has been subjected to too many charge cycles or excessive temperature. The interactive nature of battery 26 is indicated in FIG. 5 by the control and communication signal that leads to and from battery 26. The plurality of contacts 44 shown on battery subsystem 26 in FIG. 2A allow for the transmission of the power, control and communication signals from and to battery subsystem 26.

It will also be understood that battery subsystem 26 preferably is mounted to housing 42 in such a manner that it can be easily and quickly removed for maintenance, repair or replacement with a fresh, fuilly charged battery subsystem. Finally, it will be appreciated from FIG. 2B that preferably substantially all of opto-electronics 40—including the integral display that enables a user to 'see' though obscurants such as smoke or to 'see' in the absence of light-are contained within housing 42. This holds true except for those insubstantial portions that extend from the housing such as the forward region of optical engine 18 including forward portions of IR camera unit 37.

A helmet clip 42C also may be seen from the drawings to extend slightly forward and above the upper front edge of housing 42. Other quick release mechanisms may be used to attach apparatus 10 to a protective helmet of the type typically worn by firefighters. A headband or strap B, shown in FIG. 1A, may be attached to apparatus 10 for additional support, at eyelets 42E. It is intended but not essential that apparatus 10 may be passed between firefighters as needed, while the firefighters are fuilly clothed in typical protective gear including hoods and gloves.

The preferred horseshoe shape of housing 42 is designed, in par, to ease handling of apparatus 10 by a gloved hand. The horseshoe shape is defined by left arching region 12 and right arching region 14 (the legs of the horseshoe) interconnected by front region 16. Legs 12 and 14 fulnction as carrying handles for apparatus 10, if needed. Legs 12 and 14 even allow a firefighter to hold apparatus 10 in a viewing vt position without attaching apparatus 10 to a helmet or strapping it to a user's head. This may be particularly useful if apparatus 10 is passed fr equently between firefighters in the midst of a fire, or if apparatus 10 or a firefighter's helmet becomes dislodged or structurally damaged.

Opto-electronics 40 including electronics 46 will be described now by a reference to the schematic block diagram of FIG. 5, which, for completeness, also includes battery subsystem 26 and external options to be described. Detector array 20 preferably is mounted on a cameralbuffer printed circuit board (PCB) 48 which includes digital memory 22 for buffering digital scenery data obtained by the optical engine. Optical engine 18 and, battery subsystem 26 counterbalance one another along the legs.

Heatsink, or phase change module, 28 will be understood to be mounted in close physical proximity to detector 20 and other sensitive electronics mounted on camera/buffer PCB 48 and microprocessor PCB 50, so as to dissipate heat radiating therefrom and to maintain the detector and the electronics within predefined limits compatible with proper operation thereof. Preferably, heatsink 28 is placed far enough back in leg 14 of housing 42 so that it counterbalances detector 20 along leg 14. Battery subsystem 26 in leg 12 further counterbalances detector 20 along leg 12, while at the same time offsetting the weight of heatsink 28 so that apparatus 10 is balanced laterally as well, in a direction extending along forward region 16.

Microprocessor 24 preferably is separately mounted on a microprocessor PCB 50 located nearby so that timing, control, gain, image data and power are shared between the PCBs. Optical engine 18 preferably includes an NUC shutter 52 and IR optics 54 and drive and heat signals are routed to shutter 52 from camera/buffer PCB 48 as shown. An optional software development connector 56 may be provided as shown in FIG. 5 that facilitates future software development and upgrades that may be implemented in the form of programmable read-only memory (PROM) that preferably is an integral part of microprocessor 24.

Microprocessor PCB 50, with camera/buffer PCB 48 preferably mounted thereon, is mounted on a printed circuit motherboard/display board 58 and routes power, audio, control and digital LCD video signals therebetween. Board 58 also mounts LCD backlight electronics 60, LCD 32 and display optics 62 as shown. Board 58 provides power and control via a power distribution board 64 to battery subsystem 26. Optionally, a video transmitter 66 or video recorder 68 or both may be supported as external options to apparatus 10 via a provided NTSC/PAL video (RS-170) input/oupuw port mounted on motherboard/display board 58. It will be appreciated by those skilled in the art that other external options may be provided, within the spirit and scope of the invention. However, current implementation of these added options may seriously limit the portability and exchangeability of apparatus 10 between firefighters.

Battery subsystem 26 is an important contributor to the portability and high functional density of apparatus 10. Battery subsystem 26 includes a switch 70 and a lightemitting diode (LED) 72 for switching power on and off in apparatus 10 and for indicating when power is on. It will be appreciated that these are battery save features of apparatus 10 intended to extend its useful operating life without the user having to replace the battery subsystem.

In accordance with a preferred embodiment of the invention, battery subsystem 26 provides power conversion from battery voltage to the regulated +3.3 volts direct current (VDC), ±5VDC, ±12VDC required by optoelectronics 40. It also provides sufficient holdover (internal capacitance) to support low-power operation of apparatus 10 when the battery is unexpectedly removed. The battery that forms a preferably lightweight, low-cost, removable and rechargeable part of battery subsystem 26 when fully charged provides a minimum of 1 hour's operation when new, and a minimum of 40 minutes' operation after 500 charge/discharge cycles. Importantly, the battery contacts disconnect prior to external environmental exposure when installing and removing the battery into and from housing 42 to avoid possible explosive atmospheric exposure to electrical potential. This is accomplished via the mechanical design of the mounting structure and seal configurations.

Self-contained, sealed, liquid or plural-phase heatsink 28 may take any suitable form, but in accordance with the preferred embodiment of the invention, may be thought of as a plural-phase heatsink that by its solid/fluid character may be contained within a finite volume over its operating curve. Importantly, only a self-contained system enables a firefighter to easily employ and deploy such a vision/display system in a fire without a restraining umbilical, for example, to a separate coolant source. The use of a high-temperature-range plural phase polymer as a heatsink material avoids exhaust problems or the removal of high-temperature by-products, e.g. the steam produced by heating water.

Heatsink 28 is low-mass including sealed container and material contents, and provides for the thermal storage of 3100 calories of heat of fusion at a 65° C. (149° F.) to 75° C. (167° F.) melting point. Heatsink 28 in its preferred embodiment utilizes organic paraffin, such as beeswax, or n-hexatriacontane, C36H74. Organic paraffins typically have high heats of fusion per unit weight, melt homogeneously, and do not supercool.

One particular heatsink material believed to work well is available from Le Technologies, Inc., Hillsboro, Oreg., as product 04000850. It includes approximately 80% or less modified paraffin wax, CAS 64742-51-4, up to 25% amide wax, CAS 13276-08-9, up to 25% ethylene vinyl acetate copolymer, CAS 24937-78-8, and up to 3% antioxidant, CAS 10081-67-1. Many other phase-change materials might be used, including fatty acids, salt hydrates, fused salt hydrates, and metallic eutectic compounds. Heatsink 28 is intended to maintain the IR detector array hot side temperature below 80° C. under all rated environmental conditions, at least for a limited time.

The use of the invented liquid or plural-phase heatsink permits apparatus 10 to operate usefully, depending upon the ambient temperature of the environment in which it is used, over varying periods of time. For example, apparatus 10 may be operated indefinitely without interruption in ambient temperatures −10° C. $\leq T_A < 30°$ C. (14° F.$\leq T_A \leq 86°$ F.); up to 2 hours at $T_A = 40°$ C. (104° F.); one hour at $T_A = 50°$ C. (~120° F.); twenty minutes at $T_A = 80°$ C. (176° F.); ten minutes at $T_A = 100°$ C. (212° F.); five minutes at $T_A = 150°$ C. (302° F.); and two minutes at $T_A = 315°$ C. (~600° F.).

Other important features of the invention that complement the self-contained, head-mount features of vision/display system 10 include its ergonomics and colorized display. Ergonomically speaking, apparatus 10 is easily employed and deployed by simply slipping it onto the face and over the ears, and perhaps by securing it with a clip 42C and a band B that extends over the brim or bill of the firefighter's helmet, as shown best in FIG. 1A, with no connections to other equipment being required. It will be appreciated also that apparatus 10 is dimensioned and configured to avoid interference with other gear such as typically may be worn by users of apparatus, e.g. helmets, respirator or gas masks, e.g. SCBA, and attire. Thus the size and shape of apparatus 10 is designed for more than low weight or volume, it also is sized and shaped to conform to and extend around an average user's head and face at approximately eye level, while not extending laterally around the head of the user any more than is necessary or radially therefrom more than 3-inches.

The colorization of the IR display is of great benefit in avoiding temperature extrema which tend to saturate the image field. It will be appreciated that apparatus 10 has a very wide thermal dynamic range that enables it to accurately survey scenes having temperatures ranging between 0° C.$\leq T_s < 815°$ C. (32° F.$\leq T_s \leq 1500°$ F.). Where there are present extreme temperature ranges, it is difficult in monochrome or color display systems to differentiate extremely high temperatures, e.g. a gaseous, flammable vapor that may be several hundred degrees Centigrade, and relatively low temperatures, e.g. a living human being the surface temperature of which typically is under forty degrees Centigrade.

Color coding temperature ranges, via microprocessor 24 in cooperation with one or more image buffers in memory 22, may, for example, represent dangerously high avoidance zones having avoidance temperature ranges like fires, e.g. $T_{S1} \geq 600°$ C. in shades of red, intermediate temperature ranges, e.g. 100° C.$\leq T_{S2} \leq 600°$ C., in shades of gray and relatively low target temperature ranges that might be rescue targets like human beings, e.g. 25° C.$\leq T_{S3} \leq 100°$ C. in shades of blue. This preferred color coding allows a user to readily distinguish hazardous temperature zones from 'safe' target temperatures, which may be targets of particular interest to the firefighter. The representation of intermediate temperature ranges in the color range of gray de-emphasizes those zones of the scene that are normally of little interest to a firefighter, because the zones are of too high a temperature to be a rescue target, and too low a temperature to be a threat to the protective gear used by the firefighter.

Some other neutral color may be used instead of or addition to gray for the representation of the intermediate temperature ranges, such as brown or copper. Similarly, some color other than red or blue may be used for target and avoidance temperature ranges, provided, preferably, that the color of the target and/or avoidance portions be visually distinct from all other portions of the color image. Red is believed to readily distinguish those portions of the scene that are at a dangerously high temperature. The novel color coding also avoids occurrences of monochrome or polychromatic saturation of displays by which object profile and character often are obscured.

Other inventive features briefly include the provision of remote wireless monitoring via an optional pocket-sized, belt-worn transmitter 66 operatively connected to an input/output port of the microprocessor via suitable means such as a video cable and adding radiometric, e.g. numierical temperature readout, capability to apparatus 10. The latter feature requires calibration, which is facilitated in accordance with the preferred embodiment of the invention by the fact that bolometric detectors are relatively easier to calibrate than are pnror art ferro-electric detector or cryogenically cooled elements. Apparatus 10 also preferably provides a NTSC/PAL output port for the digital video signals to be provided to an external display monitor.

The invented apparatus represents a step-wise decrease in volume and weight in IR imaging systems, with the weight of apparatus 10 under 4-pounds and the is internal and external volume of apparatus 10 under 80, e.g. 71, cubic inches and 120, e.g. 105, cubic inches, respectively. Such is made possible, in part, by forming housing 42 using a suitably durable but lightweight polymer preferably via suitable injection molding techniques. Such volume and weight, coupled with the increase in functionality, will be referred to herein as high functional density. It involves miniaturizing IR imaging systems to render them more self-contained, portable, low-cost, etc., and results in a significant utility improvement.

In accordance with a preferred embodiment of the invention, apparatus 10 weighs less than 4-pounds, making it extremely portable and comfortably wearable by a user. This extremely low weight renders apparatus 10 comfortably worn, and transported and stored on the person of the user or a vehicle or storage area, and makes it easily ported among users. In other words, apparatus 10 by virtue of its extremely low weight is as easy to deploy and stow and handle as a piece of clothing or accessory, yet it is extremely valuable as a firefighting or surveillance tool. Such low weight is achieved in accordance with the invention by a combination of component selection, especially in the selection of low-weight batteries, heatsinks and optical elements, and a preferably integrally molded clam-shell type housing requiring little or no hardware to seal its contents against environmental extremes such as salt or fresh water spray or airborne contaminants.

Another aspect of the invention is the color or other coding of images whereby temperature-representing pixels are classified into selected temperature ranges and color coded to represent particular ranges for visual image enhancement, e.g. to highlight visually those portions of the scene that may contain a living hunan being whose temperature is within a certain relatively low predefined range and/or to visually diminish a flaming background whose temperature is within a certain relatively high predefined range. This concept is not limited to fire fighting, but is broadly applicable to IR imaging wherein a broad range of temperatures is expected and wherein an important feature within a field of view might otherwise be masked from view by color saturation due to the prevalence of extreme temperatures around the target object. For example, it may be useful in temperature-condition monitoring, law enforcement and television broadcast. This aspect of the invention will be referred to herein as a high-contrast ratio visual image enhancement method.

Figure 6:
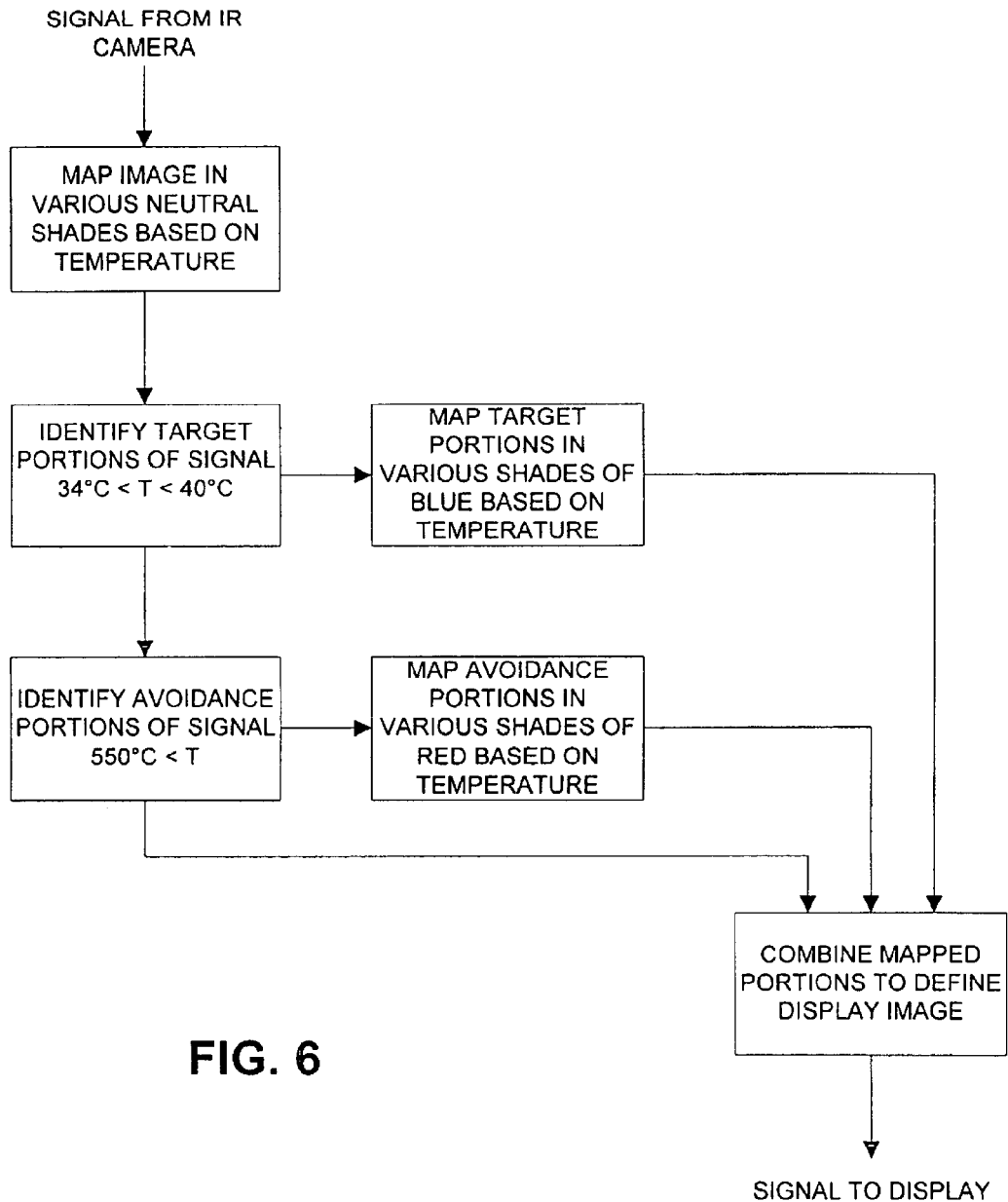
FIG. 6 is a flowchart illustrating the color mapping method used in the invented apparatus for image enhancement
Figure 7A:
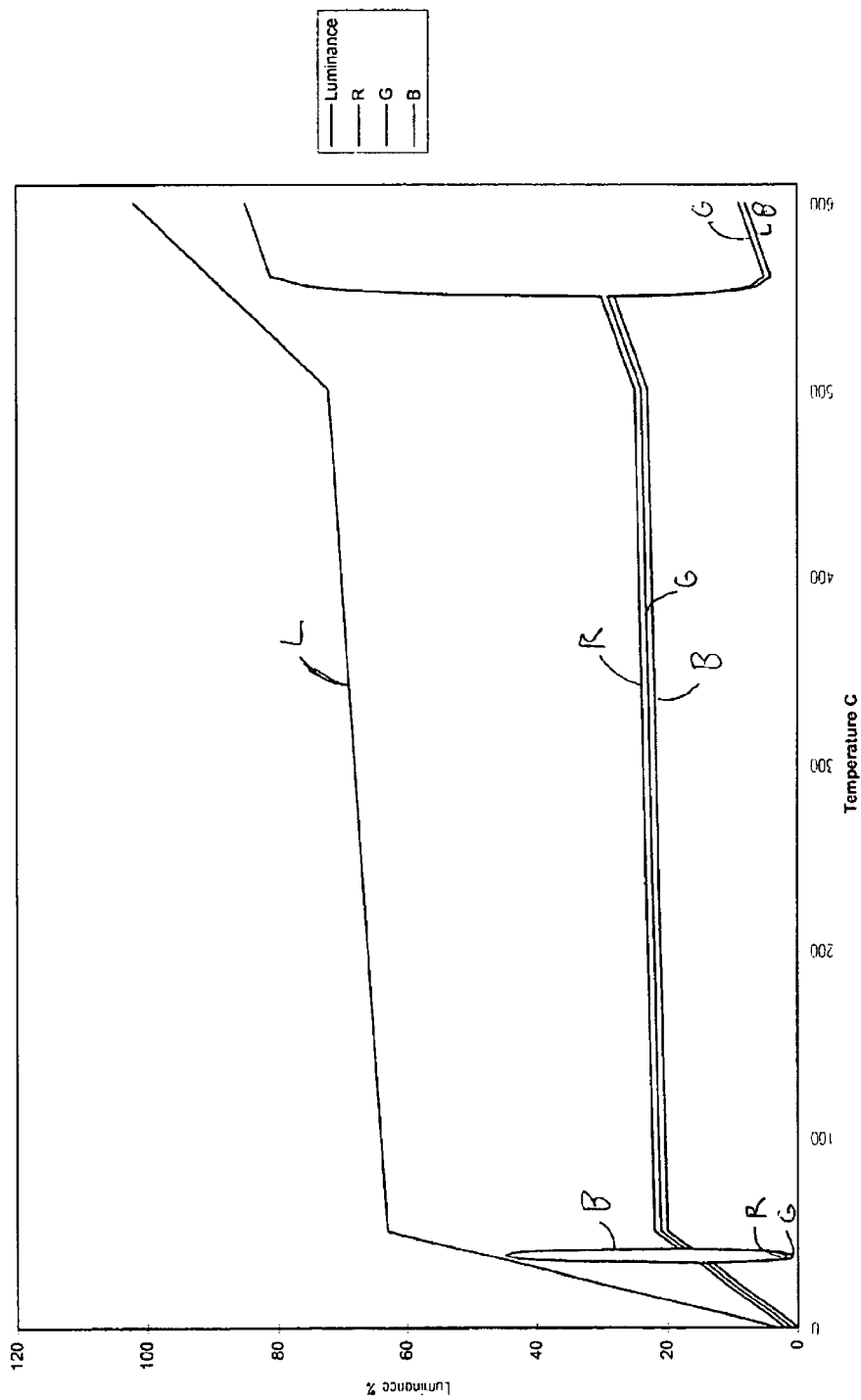

FIGS. 6, 7A and 7B illustrate the preferred technique by which color mapping is accomplished in apparatus 10 in accordance with the invention. It is noted in this connection that monochrome displays lend themselves to shape identification, whereas polychrome: displays lend themselves to temperature identification. Thus, the invention in its preferred embodiment uses a combination of monochrome and color displays in which normal temperature ranges are presented on LCD 30 in monochrome to facilitate feature ID and extreme temperature ranges might be presented thereon in polychrome to facilitate temperature ID. In this way, background may be presented in gray-scale and highlights of particular interest may be presented in color. AU such temperature zone identification, isothermal boundary imaging and color coding readily are accomplished by software and firmware operating within self-contained microprocessor 24.

A gray-scale image in the present invention is created on LCD 32 by mapping the image in pixels, with any particular pixel being produced on the screen by equal levels of the red, green and blue portions of an RGB multicolor signal. The luminance produced by the combined RGB signal for each pixel is modulated as a function of the temperature of the portion of the sensed scene. This is done by firmware in microprocessor 24, preferably using histogram-equalization image processing. Examples of such histogram equalization used in connection with machine vision systems are found in U.S. Pat. Nos. 5,083,204 and 5,563,962, the disclosures of which are incorporated herein by reference.

Preferably, IR camera unit 37 is radiometrically calibrated so that the image on LCD 30 accurately represents the thermal profile of the scene within the field of view of IR camera unit 37, and not just a relative temperature as found in prior art devices. Optionally, the calibrated signal from unit 37 is further processed to highlight selected temperature ranges in a selected color. A unique aspect of this highlighting is that the signal is mapped so that the highlighting within the selected temperature range is within a range of the selected color, as described below.

The graphs in FIGS. 7A and 7B illustrate how the highlighting is mapped to the displayed image. The RGB luminance as a function of temperature is represented in FIGS. 7A and 7B as three linear regions, each a linear function of temperature. This linear representation is a gross simplification, particularly when histogram equalization and automatic gain control is used, but it clarifies the color mapping routine of the present invention. The luminance of the red and green signals of the RGB signal have been shifted slightly so that it is easier to distinguish the individual R, G, and B signals.

Within a particular temperature range, such as near human body temperature, or at extreme temperatures (above 550° C. in FIG. 7A), the equalized mapping of the RGB portion of the signal is shifted to favor one color, with compensating decreases in the corresponding portions of the RGB signal. The preferred color highlighting is to emphasize one of the base components of the RGB signal, such as blue for the human target zone, and red for the extreme temperature zone. The highlighting of the human temperature zone in shades of blue is shown in detail in FIG. 7B.

The luminance of the highlighted portions of the image are maintained relative to the non-highlighted portions adjacent in temperature range to the highlighted temperature range by the compensation discussed above. However, luminance highlighting in addition to the described color highlighting may be added, by changing the compensation routine. For example, by increasing the blue portion of the RGB signal as desired within the selected temperature range, without making any compensation to the red or green portions of the RGB signal, the relative luminance will be increased within the selected temperature range, and the portions of the image in the selected temperature range will be highlighted in ranges of blue.

It is intended that the color highlighting of the present invention may be applied to various or multiple temperature ranges as the situation requires or allows. For firefighting and other life-threatening activities, it is believed that it is safer to highlight only a few key portions of the image, such as those representing a human target and excessive heat. Other highlighted temperature ranges may be identified based on a particular activity such as fire control, in which the image might be highlighted to show different levels of combustion, or such as fire cleanup, in which the image might be highlighted to show dangerous hotspots within walls or other structure.

The software and fimnware within microprocessor 24 provides other advantages. Preferably the firmware upon the application of power automatically uses default settings for many operating parameters of apparatus 10, with such default settings stored in non-volatile memory such as read-only memory (ROM). Such permanently stored default settings preferably include control settings for image temperature range, and display brightness. The firmware preferably indicates to the user normal operating conditions including the elapsed time on the battery and the battery charge level. The firmware preferably provides user warnings of critical operating conditions such as failed power, critical battery level (e.g. <5 operating minutes remaining) and internal temperature alarm indicating that the optoelectronics are operating above their nominal maximum operating temperature. Many of the system parameters may be reprogrammed. For example, apparatus 10 may first be used for a rescue operation, and then used for a fire control fig operation, in which case different temperature ranges of the scene may be highlighted in the image. Such a change might be accomplished by an external switch on housing 42, not shown, which triggers different routines within the firmware of apparatus 10. Currently, reprogramming is accomplished by connecting a programuming computer to the power/controllcommunication contacts associated with battery subsystem 26, or to software development connector 56.

Figure 4A:
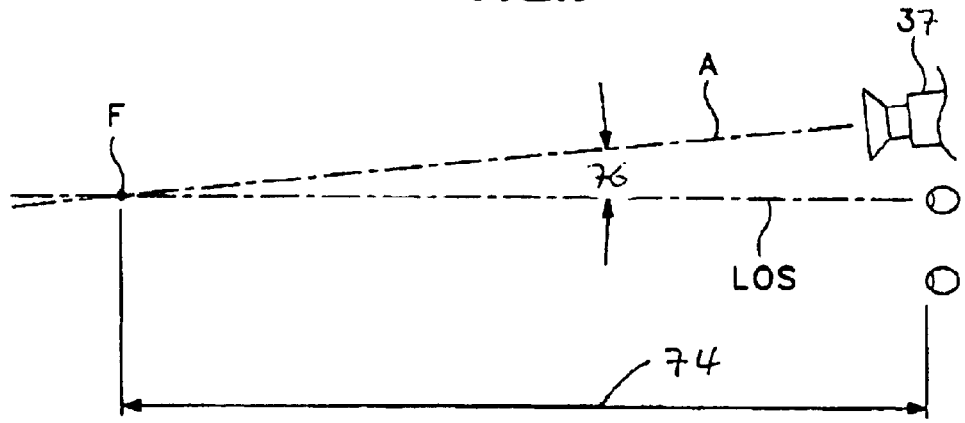
FIGS. 4A and 4B are schematic diagrams respectively showing an overhead and lateral view of a user and a camera head-mounted camera, the views illustrang line-of-sight and focal axes and their convergence in front of the user.
Figure 4B:
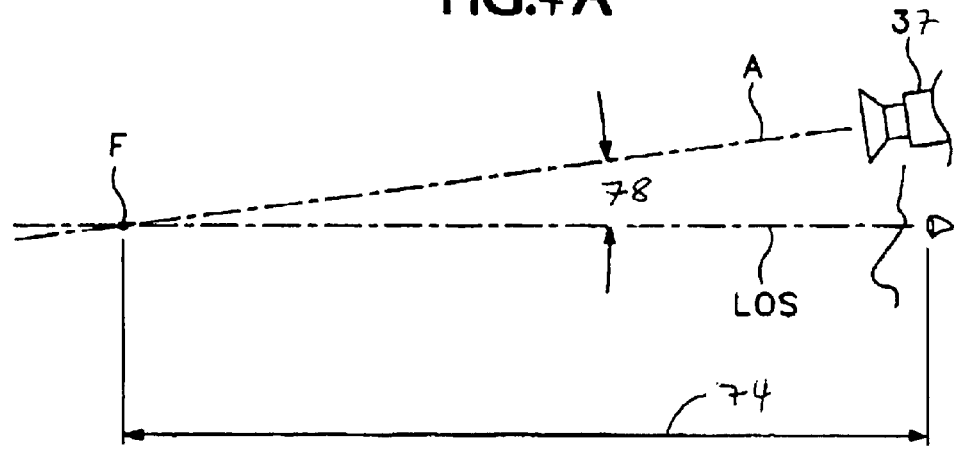

Referring now to FIGS. 4A and 4B, a head-mounted camera such as IR camera 37 of apparatus 10 and a head of a user wearing such apparatus including the camera are shown schematically in overhead and side views. The camera and its positioning and mounting within housing 42 (not shown in the simplified schematic diagram but understood to be in keeping with the teachings of the present application) of apparatus 10 achieves an important advantage over prior art portable thermal imaging systems. A parallax problem exists in conventional systems wherein the optical axis of the camera is parallel with the line of sight of the user.

This problem results from the off-axis, asymmetric location of the camera relative to'the eye or centerline of the eyes of the user. The problem is a serious one, especially in life-threatening or hazardous situations such as firefighting. In the near field of 'view' through the camera, the user has difficulty handling objects within arm's reach because the camera effectively misrepresents to the user the object's location to the extent of the vertical and lateral offset between the user's eyes and the camera's 'eye.' A user thus tends to reach for an object imaged by the camera only to grope for it where its position is falsely indicated, a few inches typically from where the object actually is located in space.

Apparatus 10 solves this problem by providing convergence of optical axis A defined by optical engine 18 (of which IR camera 37 is a part) and an axis describing the user's virtual or nominal line of sight through the right eye that is viewing the scene on LCD 32. This is accomplished by mounting optical engine 18 within housing 42 such that the optical axis converges the nominal line of sight to define a point of convergence F. It will be appreciated that, in accordance with the invention, the user's line of sight is actually to a virtual scene produced for display on a mirrored lens within apparatus 10 but that the user's nominal line-of-sight axis Au may be projected into the scene, as illustrated, for purposes of explaining another feature of the invention. Accordingly, FIGS. 4A and 4B illustrate a virtual line of sight of the user and the focal point along such virtual line of sight representing the effective focal path of the user viewing a scene on such a display.

The angle of convergence is chosen such that convergence F of the axes occurs at a nominal arm's length spaced away or in front of the user's right eye, e.g. between 2- and 4-feet, and typically approximately 3-feet away. This distance is indicated in FIGS. 4A and 4B by a solid horizontal line 74 extending from the point of convergence F and the user's eye. The angles of convergence between the optical axis A and line of sight LOS in the horizontal plane and in the vertical plane are indicated as 76 and 78 in FIGS. 4A and 4B, respectively.

Objects within the user's grasp will be found where indicated by the image projected on LCD 32 because the camera is targeting and imaging the object with the angular offset that overcomes the above problem, typically in a range of between approximately 4- and 10- degrees. In accordance with a preferred embodiment of the invention, the optical axis of optical engine 18 is aimed down in a vertical plane by and angle of approximately 6-degrees and to the side in a horizontal vertical plane by and angle of approximately 8-degrees by configuring housing 42 to mount IR camera 37 at corresponding angles that converge approximately 3 feet in front of the user's right eye with the user's line of sight from the right eye.

Users of apparatus 10 thus reach to grasp an object in front of them based upon the image projected on LCD 32 and fnd the object where they reach without difficulty and without groping as with prior art systems in which the camera's optical axis and the user's line of sight are parallel with one another. In the user's very far field of view, objects' location are slightly offset vertically and laterally as a result of the alignment of IR camera 37, but it is believed that there is little difficulty for a user to proceed toward a distant object and locate the object readily once the object is a few feet in front of the user. Thus the invented solution to the prior art parallax problem surprisingly is without disorientation when 'viewing' a distant object.

The invention will be understood to include an apparatus and a method of representing a thermal image in a portable device, as described above. The steps of the method include generating an electronic signal representative of a scene in front of a user using an infrared camera, identifying target portions of the electronic signal that represent portions of the scene that are within an identified target temperature range, and mapping the electronic signal to display a color image of the scene. Preferably, the target portions of the electronic signal are mapped in a color range that is visually distinct from all other portions of the color image. The method may also include the steps of identifying avoidance portions of the electronic signal that represent portions of the scene that are above an identified avoidance temperature; mapping the avoidance portions of the electronic signal to the color image in a color range that is visually distinct from all other portions of the color image, and mapping those portions of the electronic signal that do not represent target and/or avoidance portions to the color image in a neutral color range. Preferably, this is done by producing a multicolor RGB signal representative of the image, and emphasizng at least one color of the multicolor signal. Other colors of the multicolor signal may be de-emphasized so that the relative luminance of the target portions of the image remain approximately equivalent to the relative luminance of portions of the image that represent portions of the scene that are near to the identified temperature target range.

The foregoing description of the preferred embodiment of the invention has been presented for purposes of illustration and description. It is not intended to be exhaustive or to limit the invention to the precise form disclosed, and many modifications and variations are possible in light of the above teaching. The embodiment was chosen and described in roder to best explain the principles of the invention and its practical application to thereby enable others skilled in the art to best utilize the invention in various embodiments and with various modifications as are suited to the particular use comptemplated. It is intended that the scope of the invention be defined only by the claims.

We claim:

1. A method of representing a thermal image in a portable device, comprising:

generating an electronic signal representative of a scene adjacent a user using an infrared camera;

identifying selected portions of the electronic signal that represent portions of the scene that are within an identified temperature range selected to highlight target portions of the scene near human body temperature; and mapping the electronic signal to display an image of the scene, wherein the selected portions of the electronic signal are mapped to the image in a color range that is visually distinct from all other portions of the image.

2. The method of claim 1, wherein the portions of the electronic signal that do not represent the selected portions are mapped to the image in a neutral color range.

3. The method of claim 2, wherein the neutral color range is monochrome.

4. The method of claim 3, wherein the neutral color range is shades of gray.

5. The method of claim 1, wherein the selected portions of the electronic signal are displayed in at least one color, and the portions of the electronic signal that do not represent the selected portions are displayed in monochrome or a relatively fixed color markedly different from the at least one color, such that a user viewing the image can readily distinguish the portions of the scene that are within the identified temperature range.

6. The method of claim 1, wherein the step of mapping includes:

producing a multicolor signal representative of the image; and emphasizing at least one color of the multicolor signal.

7. The method of claim 6, wherein the multicolor signal is an RGB signal.

8. The method of claim 6, wherein the step of mapping further includes de-emphasizing other colors of the multicolor signal so that the relative luminance of the selected portions of the image remain approximately equivalent to the relative luminance of portions of the image that represent portions of the scene that are near to the identified temperature range.

9. The method of claim 1, the selected portions of the electronic signal being first selected portions, and the identified temperature range being a first identified temperature range, further comprising:

identifying second selected portions of the electronic signal that represent portions of the scene that are within a second identified temperature range; and mapping the second selected portions of the electronic signal to the image in a color range that is visually distinct from all other portions of the image.

10. The method of claim 9, wherein the first selected portions correspond to target portions of the scene, and the second selected portions correspond to avoidance portions of the scene.

11. The method of claim 10, wherein the target portions correspond to a human target.

12. The method of claim 10, wherein the avoidance portions correspond to excessive heat.

13. The method of claim 10, wherein the portions of the electronic signal that do not correspond to the target or avoidance portions are mapped to the color image in a neutral color range.

14. The method of claim 13, wherein the neutral color range is shades of gray.

15. The method of claim 10, further comprising using the mapped image to distinguish between a human target and excessive heat.

16. The method of claim 1, wherein the portable device is a firefighting device.

17. The method of claim 16, further comprising adding a numerical temperature readout capability to the portable device.

18. The method of claim 1, wherein the scene is in front of the user.

19. The method of claim 1, wherein the infrared camera generates pixel data representative of the temperature of corresponding points in the scene.

20. A method of representing a thermal image in a portable device, comprising:

generating an electronic signal representative of a scene adjacent a user using an infrared camera;

identifying selected portions of the electronic signal that represent portions of the scene that are within an identified temperature range that includes temperatures that represent a threat to the user of the portable device; and mapping the electronic signal to display an image of the scene, wherein the selected portions of the electronic signal are mapped to the image in a color range that is visually distinct from all other portions of the image.

21. The method of claim 20, wherein the portions of the electronic signal that do not represent the selected portions are mapped to the image in a neutral color range.

22. The method of claim 21, wherein the neutral color range is monochrome.

23. The method of claim 22, wherein the neutral color range is shades of gray.

24. The method of claim 20, wherein the selected portions of the electronic signal are displayed in at least one color, and the portions of the electronic signal that do not represent the selected portions are displayed in monochrome or a relatively fixed color markedly different from the at least one color, such that a user viewing the image can readily distinguish the portions of the scene that are within the identified temperature range.

25. The method of claim 20, wherein the step of mapping includes:
    producing a multicolor signal representative of the image; and
    emphasizing at least one color of the multicolor signal.

26. The method of claim 25, wherein the multicolor signal is an RGB signal.

27. The method of claim 25, wherein the step of mapping further includes deemphasizing other colors of the multicolor signal so that the relative luminance of the selected portions of the image remain approximately equivalent to the relative luminance of portions of the image that represent portions of the scene that are near to the identified temperature range.

28. The method of claim 20, wherein the identified temperature range includes temperatures between about 25° C. and about 100° C.

29. The method of claim 20, wherein the identified temperature range is selected to highlight portions of the scene near human body temperature.

30. The method of claim 20, wherein the identified temperature range includes temperatures higher than about 550° C.

31. The method of claim 20, wherein the identified temperature range includes temperatures that correspond to excessive heat.

32. The method of claim 20, the selected portions of the electronic signal being first selected portions, and the identified temperature range being a first identified temperature range, further comprising:
    identifying second selected portions of the electronic signal that represent portions of the scene that are within a second identified temperature range; and
    mapping the second selected portions of the electronic signal to the image in a color range that is visually distinct from all other portions of the image.

33. The method of claim 20, wherein the portable device is a firefighting device.

34. The method of claim 33, further comprising adding a numerical temperature readout capability to the portable device.

35. The method of claim 33, further comprising identifying different levels of combustion using the mapped image.

36. The method of claim 33, further comprising identifying hotspots within walls or other structure using the mapped image.

37. The method of claim 20, wherein the scene is in front of the user.

38. The method of claim 20, wherein the infrared camera generates pixel data representative of the temperature of corresponding points in the scene.

39. The method of claim 20, wherein the system has a thermal dynamic range and the identified temperature range covers less than half of this range.

40. A method of representing a thermal image in a portable device, comprising:
    generating an electronic signal representative of a scene adjacent a user using an infrared camera;
    identifying first selected portions of the electronic signal that represent portions of the scene that are within a first identified temperature range; and
    identifying second selected portions of the electronic signal that represent portions of the scene that are within a second identified temperature range; and
    mapping the electronic signal to display an image of the scene, wherein the first and second selected portions of the electronic signal are mapped to the image in color ranges that are visually distinct from each other and from all other portions of the image.

41. The method of claim 40, wherein the first selected portions correspond to target portions of the scene, and the second selected portions correspond to avoidance portions of the scene.

42. The method of claim 41, wherein the target portions correspond to a human target.

43. The method of claim 41, wherein the avoidance portions correspond to excessive heat.

44. The method of claim 43, wherein the avoidance portions correspond to temperatures higher than about 550° C.

45. The method of claim 41, further comprising using the mapped image to distinguish between a human target and excessive heat.

46. The method of claim 40, wherein the portions of the electronic signal that do not represent the selected portions are mapped to the image in a neutral color range.

47. The method of claim 46, wherein the neutral color range is monochrome.

48. The method of claim 47, wherein the neutral color range is shades of gray.

49. The method of claim 40, wherein the first and second selected portions of the electronic signal are displayed in at least one color, and the portions of the electronic signal that do not represent the selected portions are displayed in monochrome or a relatively fixed color markedly different from the at least one color, such that a user viewing the image can readily distinguish the portions of the scene that are within the first and second identified temperature ranges.

50. The method of claim 40, wherein the step of mapping includes:
    producing a multicolor signal representative of the image; and
    emphasizing at least one color of the multcolor signal.

51. The method of claim 50, wherein the multicolor signal is an RGB signal.

52. The method of claim 50, wherein the step of mapping further includes de-emphasizing other colors of the multicolor signal so that the relative luminance of the selected portions of the image remain approximately equivalent to the relative luminance of portions of the image that represent portions of the scene that are near to the identified temperature range.

53. The method of claim 40, wherein the portable device is a firefighting device.

54. The method of claim 53, further comprising adding a numerical temperature readout capability to the portable device.

55. The method of claim 53, further comprising identifying different levels of combustion using the mapped image.

56. The method of claim 53, further comprising identifying hotspots within walls or other structure using the mapped image.

57. The method of claim 40, wherein the scene is in front of the user.

58. The method of claim 40, wherein the infrared camera generates pixel data representative of the temperature of corresponding points in the scene.

59. A method of representing a thermal image in a portable firefighting device, comprising:
- generating an electronic signal representative of a scene adjacent a user using an infrared camera;
- identifying selected portions of the electronic signal that represent portions of the scene that are within an identified temperature range;
- mapping the electronic signal to display an image of the scene, wherein the selected portions of the electronic signal are mapped to the image in a color range that is visually distinct from all other portions of the image; and
- identifyng different levels of combustion using the mapped image.

60. The method of claim 59, wherein the portions of the electronic signal that do not represent the selected portions are mapped to the image in a neutral color range.

61. The method of claim 60, wherein the neutral color range is monochrome.

62. The method of claim 61, wherein the neutral color range is shades of gray.

63. The method of claim 59, wherein the selected portions of the electronic signal are displayed in at least one color, and the portions of the electronic signal that do not represent the selected portions are displayed in monochrome or a relatively fixed color markedly different from the at least one color, such that a user viewing the image can readily distinguish the portions of the scene that are within the identified temperature range.

64. The method of claim 59, wherein the step of mapping includes:
- producing a multicolor signal representative of the image; and
- emphasizing at least one color of the multicolor signal.

65. The method of claim 64, wherein the multicolor signal is an RGB signal.

66. The method of claim 64, wherein the step of mapping further includes de-emphasizing other colors of the multicolor signal so that the relative luminance of the selected portions of the image remain approximately equivalent to the relative luminance of portions of the image that represent portions of the scene that are near to the identified temperature range.

67. The method of claim 59, wherein the identified temperature range includes temperatures higher than about 550° C.

68. The method of claim 59, wherein the identified temperature range includes temperatures that correspond to excessive heat.

69. The method of claim 59, further comprising adding a numerical temperature readout capability to the portable device.

70. The method of claim 59, further comprising identifying hotspots within walls or other structure using the mapped image.

71. The method of claim 59, wherein the scene is in front of the user.

72. The method of claim 59, wherein the infrared camera generates pixel data representative of the temperature of corresponding points in the scene.

73. The method of claim 59, wherein the system has a thermal dynamic range and the identified temperature range covers less than half of this range.

74. A method of representing a thermal image in a portable firefighting device, comprising:
- generating an electronic signal representative of a scene adjacent a user using an infrared camera;
- identifying selected portions of the electronic signal that represent portions of the scene that are within an identified temperature range;
- mapping the electronic signal to display an image of the scene, wherein the selected portions of the electronic signal are mapped to the image in a color range that is visually distinct from all other portions of the image; and
- identifying hotspots within walls or other structure using the mapped image.

75. The method of claim 74, wherein the portions of the electronic signal that do not represent the selected portions are mapped to the image in a neutral color range.

76. The method of claim 75, wherein the neutral color range is monochrome.

77. The method of claim 76, wherein the neutral color range is shades of gray.

78. The method of claim 74, wherein the selected portions of the electronic signal are displayed in at least one color, and the portions of the electronic signal that do not represent the selected portions are displayed in monochrome or a relatively fixed color markedly different from the at least one color, such that a user viewing the image can readily distinguish the portions of the scene that are within the identified temperature range.

79. The method of claim 74, wherein the step of mapping includes:
- producing a multicolor signal representative of the image; and
- emphasizing at least one color of the multcolor signal.

80. The method of claim 79, wherein the multicolor signal is an RGB signal.

81. The method of claim 79, wherein the step of mapping further includes de-emphasizing other colors of the multicolor signal so that the relative luminance of the selected portions of the image remain approximately equivalent to the relative luminance of portions of the image that represent portions of the scene that are near to the identified temperature range.

82. The method of claim 74, wherein the identified temperature range includes temperatures between about 25° C. and about 100° C.

83. The method of claim 74, wherein the identified temperature range includes temperatures higher than about 550° C.

84. The method of claim 74, wherein the identified temperature range includes temperatures that correspond to excessive heat.

85. The method of claim 74, further comprising adding a numerical temperature readout capability to the portable device.

86. The method of claim 74, wherein the scene is in front of the user.

87. The method of claim 74, wherein the infrared camera generates pixel data representative of the temperature of corresponding points in the scene.

88. The method of claim 74, wherein the system has a thermal dynamic range and the identified temperature range covers less than half of this range.

89. Portable apparatus for infrared imaging, comprising:
an infrared camera for detecting and imaging a scene; and
a display operatively connected to the camera for producing an image representing a detected and imaged scene, wherein the image is color coded to represent those portions of the scene that are within an identified temperature range in a color that is visually distinct from all other portions of the image, the identified temperature range being selected to highlight target portions of the scene near human body temperature.

90. The apparatus of claim 89, wherein the identified temperature range is selected to highl ight avoidance portions of the scene corresponding to dangerously high temperatures.

91. The apparatus of claim 89, wherein the image is color coded such that the all other portions of the image are displayed in a neutral color range.

92. Portable apparatus for infrared imaging, comprising:
an infrared camera fordetecting and imaging a scene; and
a display operatively connected to the camera for producing an image representing a detected and imaged scene, wherein the image is color coded to represent those portions of the scene that are within an identified temperature range in a color that is visually distinct from all other portions of the image, the identified temperature range being selected to highlight avoidance portions of the scene corresponding to dangerously high temperatures.

93. The apparatus of claim 92, wherein the image is color coded such that the all other portions of the image are displayed in a neutral color range.

* * * * *